United States Patent [19]

Peled et al.

[11] Patent Number: 4,844,996

[45] Date of Patent: Jul. 4, 1989

[54] LITHIUM CELL

[75] Inventors: Emanuel Peled, Eevn Yehuda; Aharon Gorenshtein, Bat-Yam; Monica Segal, Petah Tiqva, all of Israel

[73] Assignee: Ramot Ltd., Tel-Aviv, Israel

[21] Appl. No.: 179,234

[22] Filed: Apr. 8, 1988

[30] Foreign Application Priority Data

Apr. 10, 1987 [IL] Israel .......................................... 82169

[51] Int. Cl.⁴ ............................................. H01M 6/14
[52] U.S. Cl. ........................................ 429/194; 429/218
[58] Field of Search .................. 429/194, 197, 218, 48, 429/49

[56] References Cited

U.S. PATENT DOCUMENTS 4,142,028  2/1979  Leger et al. ................... 429/218 X
4,264,690  4/1981  Rao ............................. 429/197 X
4,650,731  3/1987  Hoffman ........................ 429/218 X
4,652,506  3/1987  Belanger et al. ............... 429/218 X Primary Examiner—Anthony Skapars
Attorney, Agent, or Firm—Fleit, Jacobson, Cohn & Price

[57] ABSTRACT

There is provided an electrochemical charge with substantially increased safety. The cell contains a metal anode which can be alloyed by lithium, the preferred metals being selected from calcium, magnesium, and alloys of these, such cell comprising an electrolyte which is an aprotic solvent in which there is dissolved a suitable lithium salt, a cathode and a cathodic current collector. The anode can be initially charged with lithium. After a certain degree of discharge, certain embodiments of cells of the invention start forming a passivating layer on the anode preventing a runaway reaction.

10 Claims, 3 Drawing Sheets

LITHIUM CELL

FIELD OF THE INVENTION

The invention relates to lithium cells which have a high degree of safety in use. The cells are primarily intended for use as secondary cells, with a possibility of repeated charge/discharge cycles. They can also be used as primary cells.

The cells are of such construction and composition that after a certain degree of discharge there starts forming on the anode a passivating layer which prevents a subsequent runaway reaction.

BACKGROUND OF THE INVENTION

The main problems encountered during the development of rechargeable lithium batteries are: problems of safety and gradual degradation of performance (premature failure). These problems result from an unsuitable mechanism of deposition of the lithium during the charging process and from the deposition of the lithium into the cathode during cell reversal at the end of the discharge. Lithium which is deposited on the anodic current collector during charging and which is deposited on the cathode, is in the form of a fine powder or in the form of dendrites. This high surface area lithium, is pyrophoric and has a sensitivity to shock and heating in the environment of the non-aqueous cell. Thus there occur explosions or venting under thermal shocks or when such cell is subjected to a mechanical shock. The lithium dendrites are likely to form internal shorts with sparks which can result in a run-away reaction.

The phenomenon of cell-reversal is more likely to occur in multi-cell batteries where the weakest of the cells may turn into reversal at the end of the discharge of the battery.

One of the reasons for gradual cell degradation with repetition of cycles is to be found in the formation of a passivating layer which is formed on the surface of the lithium anode, which acts as a solid electrolyte interphase (termed SEI).

When a non-aqueous lithium cell is charged, lithium is plated out through such surface layer which consists of a polycrystalline material and thus is non-uniform. The results is a preferred deposit of the lithium at the grain boundaries of the microcrystals, forming dendrites or spongy deposits. During discharge part of such lithium particles lose electrical contact with the current collector and thus are not utilized, resulting in a Faradic efficiency of less than 100 per cent. Upon repeated charge-discharge cycles of such a battery, anodic mass is lost and ultimately leads to a premature failure of the battery. The lithium deposits are characterized by their high surface area, resulting in enhanced electrolytic degradation, resulting in decrease of performance.

It is one of the main aims of the present invention to modify the mechanism of lithium deposition in non-aqueous lithium batteries, resulting in a safe electrochemical cell which is repeatedly rechargeable and which has a very slow rate of degradation during repeated cycles.

SUMMARY OF THE INVENTION

The present invention relates to an improved non-aqueous primary or secondary lithium electrochemical cell type. The novel cells comprise an anodic current collector charged with lithium, a cathode, a nonaqueous electrolyte system, the choice of the anode and of the electrolyte system being such that at the end of the discharge of the cell a poorly conducting passivating film is formed at the surface of the anode (whose surface is depleted of lithium). The anodes of the cells in the uncharged state of the present invention are metals which alloy easily with lithium, such as magnesium or calcium. Under certain specific conditions also aluminum can be used.

The novel component system of the cells essentially eliminates deposition of lithium into the SEI during charging of the cell. Dendrite formation is nearly completely prevented during cell charge. Cell reversal is prevented and thus there is obtained a cell of much enhanced safety.

The novel cells are of special use in multi-cell arrangements where a weak cell in a series of cells is apt to undergo cell reversal at the end of cell discharge.

The cell comprises an anodic current collector made of a metal or alloy which is alloyed by lithium, and an aprotic solvent containing a suitable salt or salt-combination, which are chosen in such a manner that at the end of the discharge of the cell the metallic current collector is oxidized to form by interaction with the electrolyte, an insoluble product which forms a passivating film at the surface of the current collector. The resulting film is a very poor electronic and ionic conductor and thus prohibits passage of a reverse current through the cell. This essentially entirely eliminates deposition of metallic lithium into the cathode. During battery charge there can be used a current density which is low enough, and smaller than the diffusion limiting current density of lithium in the anodic current collector, and thus lithium alloys with the metal of the current collector, while the activity of the lithium at the surface is kept below unit.

By keeping the activity of lithium on the surface of the current collector below unit the deposition of pure (metallic) lithium on this surface is eliminated and no lithium is deposited into the passivating layer which covers the current collector. Suitable anodic current collector are made of magnesium, calcium and in some cases aluminum, in combination with an appropriate electrolyte system. The preferred anodic current collector is magnesium or an alloy thereof.

At room temperature the diffusion coefficient of lithium in these metals is low (about $10^{-8}$–$10^{12}$ cm$^2$/sec). In order to obtain high rate cells, it is necessary to use high surface-area, thin electrodes. It is also possible to use a porous anodic current collector in sponge form, an electrode made by sintering of metallic powder, or metallic powder bonded by a suitable binder.

Suitable binders for the formation of porous anodic current collectors are organic polymers such as polyethylene, polypropylene, polyether, etc. These must be compatible with the lithium alloy and the electrolyte. Another manner to bind metallic powder to form a porous anodic current collector is the use of another metallic powder with a low melting point, such as cadmium, lead, tin or mixtures of any of these. These metallic binders have a high overpotential for reduction of organic solvents and thus slow down the degradation of the electrolyte. The porosity of the anodic current collector should be in the range of 90-20%. depending, among others, on the desired power capability of the battery. The power capability of such batteries increased by raising the operation temperature to the range 40°–150° C. and a chosen suitable solvent or solvents mixture for this temperature range. In such cells during discharge most of the lithium leaves the anode and is deposited as lithium compound on the cathode current collector or into the cathode material. The electrolyte is chosen in such manner that upon full discharge of the cell there is formed a passivating surface coating on the anode, preventing the possiblity of a run-away reaction due to cell reversal.

When the initial cell is constructed of a suitable alloy of lithium and calcium and/or magnesium, the necessity of cell charge before use is obviated and there is obtained a primary cell.

The cell may be assembled in a fully charged state where the anode is loaded with lithium and the cathode is fully charged, or in the fully discharged state where both anode and cathode, in their fully discharged state, to be charged before used.

The solvent of choice is an aprotic one and the salt used is such that it is soluble in the solvent, whereas the magnesium and calcium salts of the same anion will be insoluble or very little soluble in the same solvent or solvent system. The electrolyte remains essentially unchanged during discharge. Only at the final stage of the discharge electrolyte provides the necessary component for the formation of the passivating surface layer on the anode. The ratio of the anode constituents can be varied within a wide range: thus the ratio between calcium and/or magnesium to lithium can be varied in a weight-ratio of from about 3:1 to about 1:2. During the charging of the cell, the anode material is alloyed with lithium, and when a thin cathode is used the thickness of this may increase during charging by a factor of about 2. As the lithium completely leaves the surface of the current collector during discharge of the cell, the current collector starts undergoing oxidation and there is formed the above mentioned passivating layer the nature of which is determined by the electrolyte composition.

The passivating layer will generally be a salt of calcium or magnesium which is insoluble in the system. It may be a sulfide or an insoluble magnesium or calcium organic compound. Other suitable salts may also be deposited.

The cells generally comprise a conventional separator, made of a suitable material for this system.

The electrolyte contains a lithium salt soluble in the non-aqueous aprotic solvent, having such anion that the corresponding calcium or magnesium salts are insoluble or very sparingly soluble in said solvent.

The cells of this kind are characterized by a high energy density, which may exceed that of NiCd cells by a factor of about 3. In order to obtain such a layer deposit at the end of the discharge, various electrolyte systems can be used. One example is that of a suitable non-aqueous solvent in which a lithium polysulfide is dissolved, resulting in the deposition of a magnesium or calcium sulfide layer on the surface of the anodic current collector. Further suitable anions are certain carbonates, sulfites, dithionates, etc.

There may be used a wide variety of cathode materials, such as $Li_zVO_x$ ( $0<z<1$; $2<x<2.5$); $TiS_2$; $MoS_2$; $SO_2$ on carbon, $Cr_3O_8$; $CoS_2$; $S$ or $Li_2S_n(5<n)$. Amongst suitable solvents are: butyrolactone, propylene carbonate, THF, dioxolane, DMSO, 2MTHF, sulfolane, ethers. Amongst suitable electrolyte salts there may be mentioned $LiPF_6$, $LiAsF_6$; $LiClO_4$, $LiCF_3SO_3$, LiI, LiBr, $LiBR_4$ (where R is alkyl or aryl).

The following may not give the desired passivating layer: LiI, LiBr and $LiBR_4$ in pure ethers.

The invention is further illustrated with reference to the enclosed drawings, in which.

Figure 1:
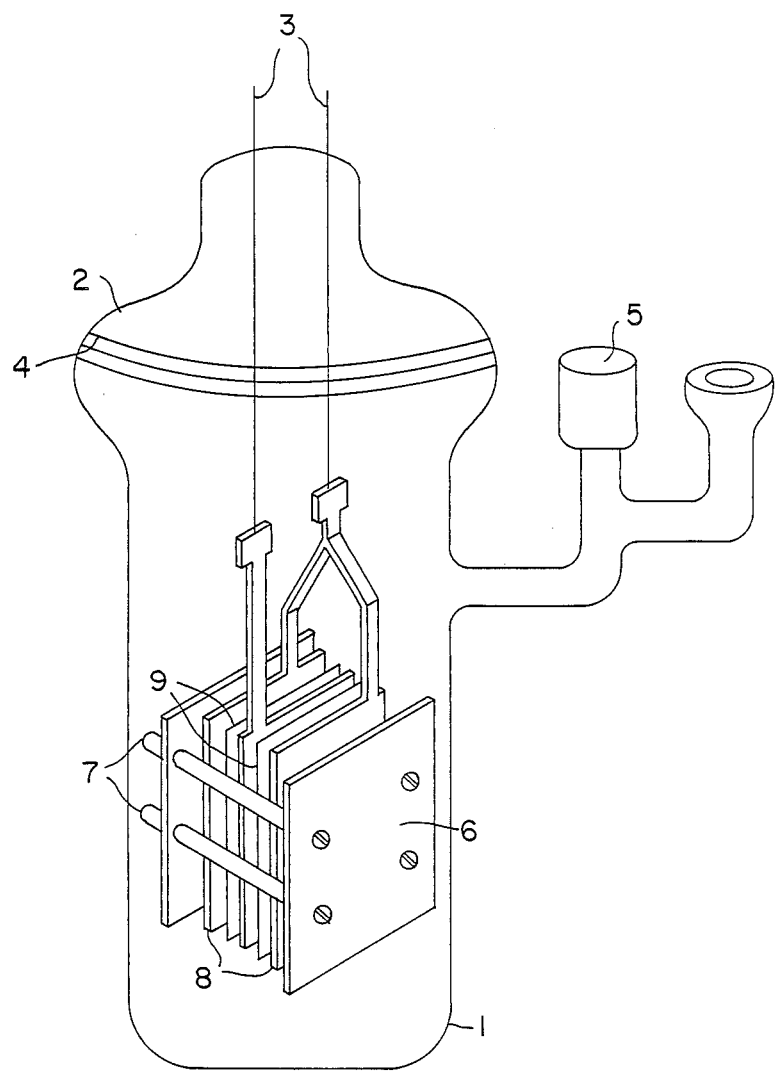
FIG. 1 is a perspective side-view, not according to scale, of an experimental cell according to the invention.

The glass laboratory cell consists of: a glass cell 1, a glass cover 2, tungsten rods 3, sealed in the glass cover; a viton O-ring 4, a rotaflo (teflon) stopcock 5, a stainless steel plate 6, stainless steel bolts 7, lithium counter electrodes 8, supported by nickel exmet; a separator 9; a lithium alloy (or an anodic current collector) 10; a lithium reference electrode, 11.

The following examples are to be construed in an illustrative nonlimitative manner:

EXAMPLE 1

The electrolyte was 2M $LiClO_4$ in 1.3 dioxolane. The anodic current collector (No. 10 in FIG. 1) was magnesium foil 0.3 mm thick. The open circuit voltage (OCV) between the magnesium and lithium reference electrode was about 1.7V. Lithium was deposited potentio-statically at +0.01V vs. the Li reference electrode. At this potential no pure metallic lithium can be deposited on the surface of the current collector. The deposition current density started from above 0.1 mAcm$^{-2}$ and decreased in 10 seconds of charging to 0.05 mAcm$^{-2}$. At this point the charging region was changed from constant voltage to constant current of 0.05 mAcm$^{-2}$. At this current density the magnesium electrode potential was 0.01V positive to the lithium reference. After 30 minutes of charging the direction of the current was changed and discharge of the magnesium electrode was started at constant current density of 0.05 mAcm$^{-2}$. The initial voltage of the magnesium electrode was 0.02 V vs the lithium reference electrode and increased slowly to 0.1$^V$ during 10 minutes (FIG. 2). However later on it rose sharply to about 16 V and decreased to a stable voltage of about 5 V. The sharp rise of the magnesium potential at the end of the discharge (depletion of lithium mass in the current collector) indicates a heavy passivation of the magnesium current collector.

EXAMPLE 2

The experiment of Example 1 was repeated with different electrolyte, consisting of 1M $LiClO_4$+0.5M $Li_2S_6$ dissolved in THF toluene 1:1 mixture. In this case due to a faster corrosion of lithium, a higher charging current density was needed. Lithium was deposited at 1 mAcm$^{-2}$ for 20 minutes and discharged at 1 mAcm$^{-2}$ at overvoltage of about 0.2 V. After 15 minutes of discharge the magnesium potential rose to 18 V and later dropped to a stable voltage of about 6 V, indicating a heavy passivation of the magnesium current collector.

EXAMPLE 3

An experiment similar to that in Example 1 was conducted with a different electrolyte which was 1.0M $LiAsF_6$ dissolved in 2M THF. Lithium deposition on magnesium and calcium was associated with a higher overvoltage. Lithium was deposited on magnesium at 1.0 mA/cm² for 20 min. with an overpotential of 0.6 V. Then it was dissolved at 0.1 mA/cm$^{-2}$ for 1 hr. with an overpotential of 0.05 to 0.2 V. After 1.5 hr the potential rose to 5 V indicating the passivation of the anodic current collector.

EXAMPLE 4

An electrochemical cell similar to Example 2 was used, however the counter-electrode (No. 10 FIG. 1) was replaced by a cathode made of a teflon-bonded porous carbon electrode (1 mm thick, 10% teflon binder and Shawinigan Acetilene Black carbon powder).

The electrolyte was 2MLiClO$_4$+0.1M Li$_2$S$_8$ in Dioxolane: THF 9:1 volume ratio.

Figure 2:
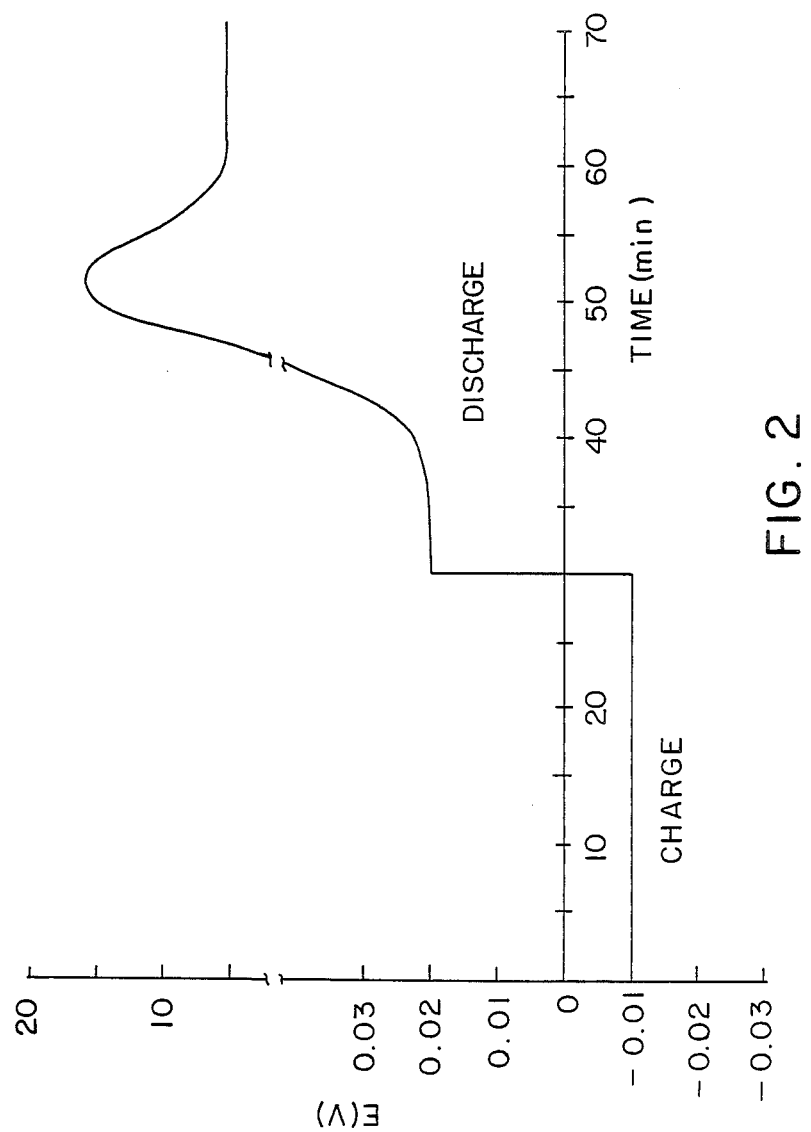
FIG. 2 is a graphical representation of a cell according to Example 1 during charge and discharge.

The anode, 8 in FIG. 1, was 20 w/o Li - 80 w/o Mg alloy. The cell discharged at constant current of 0.05 mAcm$^{-2}$ at an initial voltage of 2.11 V vs the lithium reference electrode. This voltage decreased slowly to about 1.7 V after 30 hours discharge. Later it decreased sharply, went through a 15 V peak and stabilized on about 5 V, indicating passivation of the anodic current collector. This cell was charged at 0.1 mAcm$^{-2}$ to a cut-off voltage of 2.5 V. After this charge it was discharged at 0.05 mAcm$^{-2}$ to 1.7 V. The cell was cycled in this region ten times with no significant degradation.

EXAMPLE 5

Figure 3:
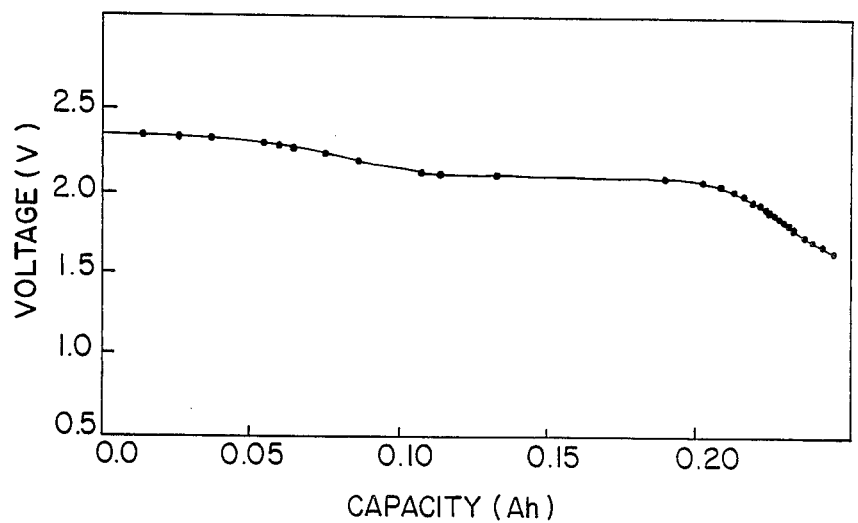
FIG. 3 is a discharge curve of cycle number 25 of a cell according to Example 5 at 1 mA/cm$^2$.
Figure 4:
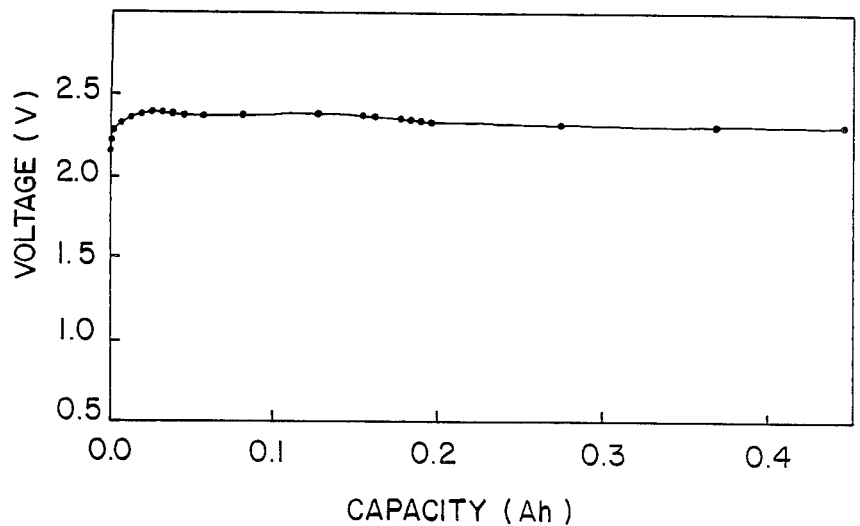
FIG. 4 is a charge curve of cycle number 25 of the cell of Example 5.

A 2/3A size spirally wound cell was used as a test vehicle. The cathode was 0.35 mm thick teflon (10% w/w) bonded carbon electrode supported by nickel grid. The anode was 0.25 mm thick 15% (w/w) Mg −b 85% Li alloy. The total electrode areas was 55 cm². The separator was 0.05 mm microporous polypropylene. The electrolyte consists of 2M LiClO$_4$ and 0.1M Li$_2$S$_6$ in 1:9 THF: Dioxolane mixture. About 1.2 Ah sulfur (based on 2 e/s) was incorporated into the porous carbon cathode. This cell was cycled at 45° C. between 2.5 V (end of charge) and 1.7 V (end of discharge). Discharge and charge currents were 50 mA. The cell delivered about 0.3 Ah at the first cycles and its capacity dropped to about 0.25 Ah after 50 cycles. A typical discharge curve is shown in FIG. 3 (for the 25th cycle) and a typical charge curve is shown in FIG. 4 (for the 25th cycle).

We claim:

1. An electrochemical cell of increased safety during discharge, adapted to prevent charge reversal and runaway reactions, comprising:
   a cathode;
   an anode comprising a metal or metal alloy which can be alloyed with lithium; and
   a liquid electrolyte comprising an aprotic non-aqueous solvent and a lithium salt dissolved in said solvent, said lithium salt being selected such that the lithium salt is soluble in said solvent and the corresponding salt comprising the metal of the anode and the anion of the lithium salt is substantially insoluble in said solvent;
   wherein, upon discharge of the electrochemical cell, a passivating layer is formed on the surface of the anode; and
   wherein, in a charged state of the electrochemical cell, said anode is loaded or charged with lithium.

2. A cell according to claim 1, where the passivating layer is a salt of calcium or magnesium.

3. A cell according to claim 1, wherein the anode comprises calcium, magnesium or an alloy thereof.

4. A cell according to claim 1, wherein the aprotic solvent is selected from the group consisting of butyrolactone, propylene carbonate, tetrahydrofuran, dioxolane, dimethyl sulfoxide, 2MTHF, sulfolane and ethers.

5. A cell according to claim 1, wherein the cathode comprises a material selected from the group consisting of Li$_z$VO$_x$, TiS$_2$, MoS$_2$, SO$_2$ on carbon, Cr$_3$O$_8$, Li$_2$S$_n$ and CoS, wherein z is between zero and one, x is between 2 and 2.5 and n is greater than 5.

6. A cell according to claim 1, wherein the lithium salt is selected from the group consisting of LiPF$_6$, LiAsF$_6$, LiClO$_4$, LiCF$_3$SO$_3$, LiI, LiBr, LiBF$_4$ and LiBR$_4$ wherein R is an alkyl or aryl.

7. A cell according to claim 1, where the anode is a porous structure comprising a metallic magnesium or calcium sponge or a calcium or magnesium metal powder bonded by a polymer.

8. A cell according to claim 7, wherein the porous anode comprises an alloy formed by sintering calcium or magnesium with a powder of cadmium, zinc, lead, tin, another low-melting point metal or a mixture thereof.

9. A cell according to claim 7, wherein the anode has a porosity of from 20 to 90 percent.

10. A cell according to claim 1, wherein the anode has a thickness of from 0.02 to 1 mm.

* * * * *